April 7, 1942.  S. S. KISTLER  2,279,121
DEVICE FOR TIMING A CHEMICAL REACTION
Filed Jan. 30, 1941

Witness
Herbert E. Covey

Inventor
Samuel S. Kistler
By Clayton L. Jenks
Attorney

Patented Apr. 7, 1942

2,279,121

UNITED STATES PATENT OFFICE 2,279,121

DEVICE FOR TIMING CHEMICAL REACTIONS

Samuel S. Kistler, West Boylston, Mass.

Application January 30, 1941, Serial No. 376,672

12 Claims. (Cl. 161—15)

This invention relates to a device for timing a chemical reaction, which is based on the subject matter of my prior application, Serial No. 264,874, filed March 29, 1939, now Patent No. 2,234,437, granted on March 11, 1941.

In cases where the rate of reaction varies with changes in the temperature, such as in the development of a photographic image or the vulcanization of rubber, the desired end point is reached more quickly as the temperature of the reacting substances is increased. If the process is being carried on in a closed chamber or in the dark where it cannot be readily observed, various problems are presented in controlling that chemical reaction so as to stop the same at the desired end point.

The primary object of this invention is to provide a timing device which will directly compensate for changes in temperature and give a signal or accomplish other results when the desired end point of a chemical reaction has been reached without regard to the temperature maintained during the reaction.

A further object of the invention is to provide an apparatus in which the forced movement of a chosen viscous medium subjected to the temperature conditions of the reacting substances may be employed to give a visual or an aural signal or to control other apparatus which is arranged to accomplish results related to or affecting the chemical reaction. Further objects will be apparent in the following disclosure.

The time of development of the photographic image, or of the curing of rubber or the time required to reach the end point of any temperature dependent chemical reaction, may be represented by the equation:

$$\log D = \frac{A}{T} + B \qquad (1)$$

where D represents the time required for the chemical reaction, T is the temperature on the absolute scale and A and B are constants.

Similarly, the viscosity of a liquid may be represented over a limited temperature range by the equation:

$$\log U = \frac{C}{T} + E \qquad (2)$$

where U is viscosity, T the temperature on the absolute scale and C and E are constants.

If, therefore, a chemical reaction proceeds to its end point in a given time at a temperature of 65° F., for example, then one may calculate the correct time for another temperature by subtracting from the first equation the further equation $$\log D_{65} = \frac{A}{525} + B$$

which results in the equation:

$$\log D_T = \frac{A}{T} - \frac{A}{525} + \log D_{65} \qquad (3)$$

In the same way one may relate the viscosity of the liquid at any given temperature to that of 65° F. by the equation:

$$\log U_T = \frac{C}{T} - \frac{C}{525} + \log U_{65} \qquad (4)$$

In these equations, 525 is the absolute temperature of 65° F., $D_T$ is the time required at temperature T, $D_{65}$ is the time at 65° F. and $U_T$ is the viscosity at temperature T.

In accordance with my invention, I choose a liquid of the proper viscosity-temperature relationship so as to make C in the equation No. 4 equal to A in equation No. 3. The value of A is determined as the result of experience in carrying on that given reaction. This value is 5500 for developing a photographic image. Hence, after inserting these values for A and C, the equation No. 4 may be subtracted from the equation No. 3 to obtain:

$$\log \frac{D_T}{U_T} = \log \frac{D_{65}}{U_{65}}$$

or $$\frac{D_T}{D_{65}} = \frac{U_T}{U_{65}} \qquad (5)$$

If, therefore, a small quantity of a viscous fluid is brought to the temperature of the developing solution or other reagents during the reaction, it is only necessary to measure the viscosity of the fluid in order to find the correct time for the chemical reaction, provided one knows the viscosity of the fluid for a standard temperature, such as 65° F.

A fundamental principle of the mechanics of a fluid is that the velocity of movement of the fluid under a constant force through a tube is inversely proportional to the viscosity of the fluid, provided the velocity is not high enough to produce turbulence. Hence, the time required for the fluid to move through a given distance within a tube or for a given amount of fluid to move through that tube is a measure of the viscosity of the liquid.

In accordance with the above principles, I propose to make a timing apparatus in which the movement of a given quantity of a viscous liquid through a tube, such as a capillary tube, under a given force, such as that of gravity, occurs in the same time interval required for a given chemical reaction.

In the drawing I have illustrated two embodiments of apparatus which are suitable for this purpose and which are arranged to give both a visual and an aural indication of the end point of a chemical reaction as well as to cause the operation of electrical apparatus.

Figures 1, 2:
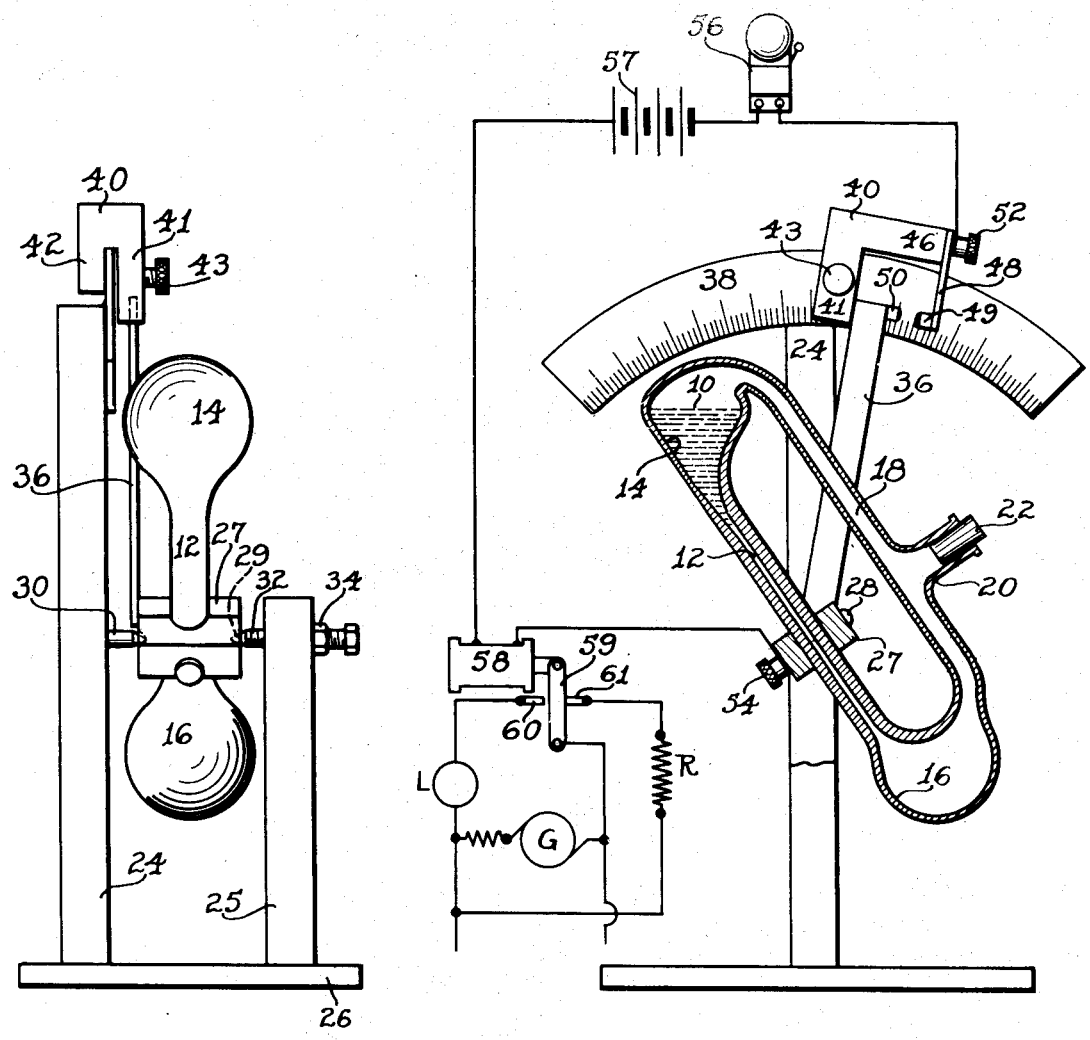
Fig. 1 is an end elevation of one form of timing device.
Fig. 2 is a front elevation of the same, partly broken away and partly in section, and including an electrical circuit operated by movement of the fluid.

In the construction shown in Figs. 1 and 2, a given quantity of a viscous fluid 10 is caused to flow under a constant force, such as that of gravity, through a capillary tube 12. The nature and the quantity of this viscous fluid is chosen in accordance with the above principles so that the end point of a chemical reaction, subjected to the same temperature conditions as is the viscous fluid, will be reached when a given quantity or all of that fluid has passed through the capillary tube. This tube may be mounted for operation in either a vertical position or at any desired angle, so that one may vary the force applied to the fluid and the rate of its flow through the capillary tube. The time of flow of the fluid through the tube will vary inversely as the sine of the angle that the tube makes with the horizontal. Hence, by inclining the tube at a desired angle, the time for carrying on the chemical reaction may be accordingly varied.

The tube may be made of a transparent material so that the movement of the viscous fluid may be observed, or it may be made of opaque material, such as the standard synthetic resins of the phenolformaldehyde condensation type. The preferred tube is made of glass or a transparent resin, such as polymerized methyl methacrylate, or other material that is not soluble in the viscous medium selected. The device is preferably shaped to provide a reservoir 14 at one end of the tube and a reservoir 16 at the other. In order to permit a quick return of the fluid from one reservoir to the other, a tube 18 of large diameter may connect these two reservoirs. The device may be initially filled with a required amount of fluid and then sealed; or, if desired and as shown in the drawing, a filler tube 20 may be connected with the large tube 18 and closed by a removable stopper 22. By this means one may change the viscous medium as desired to take care of many types of chemical reaction.

The capillary tube is preferably mounted for angular adjustment on a standard comprising the vertical posts 24 and 25 which are suitably connected to a base 26 of required dimensions. The tube 12 is clamped between the two halves of a suitably shaped split clamp 27 held together by a screw 28. The two parts of the clamp may be blocks having opposed semi-cylindrical grooves shaped to hold the tube in place by frictional contact. The clamp is provided with two opposed conical recesses 29 forming bearings for the conical end of a pin 30 and a similarly shaped end of an adjustable screw 32. The screw is threaded through an opening in the short standard 25 and may be adjustably held in position by means of a set nut 34, as will be readily understood. These bearings may be set up tightly to hold the capillary tube in a given angular position, but it is preferred that the bearings be set loosely so that the capillary device may swing freely about the axis of the members 30 and 32 for the purpose of operating other apparatus when the end point has been reached.

This apparatus is particularly intended for giving a signal or for causing other apparatus to be operated, and to that end I propose to so mount the tube and arrange the parts that when the viscous fluid has passed from the upper reservoir to the lower one, the tube will move and thus give either a visual or an audible indication of the completion of the chemical reaction and preferably operate an electrical switch in circuit with other apparatus controlled thereby. In the construction illustrated, an arm 36 is secured to the split clamp 27 and the upper end of this arm swings over a suitable graduated scale formed on an arcuate member 38 fastened on the top of the long standard 24. The indicator arm 36 may be made of resilient material and arranged to press against the scale plate 38 and thus hold the tube in any desired position. I, however, preferably mount the device in a freely movable but out of balanced condition so that the indicator arm stays in approximately an initial position until the viscous fluid has flowed to the required extent through the capillary tube and then causes the tube and arm 36 to rotate through a slight angle. This movement of the tube or the arm may be employed for the purpose of making an electrical contact which completes a circuit and causes an electric bell to ring in a suitable location, or to flash a light or to operate some other type of device.

As illustrated, a clip 40 is adjustably mounted on the arcuate member 38. This clip is slotted so that its two arms 41 and 42 lie on opposite sides of the arcuate scale member 38 and a set screw 43 is threaded into the arm 41 and arranged to clamp against the scale member and thus hold the clip 40 in any suitable adjusted position. This clip is preferably made of hard rubber, a synthetic resin or any other suitable insulating material. It has an arm 46 extending towards the right, and this carries a metal plate 48 suitably secured thereto. This plate has a metal contact 49 on its lower end lying in the path of movement of another metal contact 50 secured on the upper end of the swinging pointer arm 36. A binding post 52 on the arm 46 and another binding post 54 on the clip 27 serve for connecting thereto the wires of any suitable electric circuit.

The capillary device is so located in the clamping member 27 relative to the pivotal pins supporting the same that the pivotal axis is slightly below and to the right of the center of gravity of the revolvable capillary device, so that the upper left hand bulb or reservoir end 14 is the heavier and tends to over balance the device into a position where the pointer 36 is in contact with the arm 41 of the insulating clip 40. At this time, the contacts 49 and 50 are spaced apart. When the liquid in the upper reservoir has flowed down sufficiently to make the lower bulb 16 the heavier, this serves to swing the device and move its center of gravity far enough to the right so that the pointer will snap over and cause the contacts 49 and 50 to touch and thereby complete the electric circuit.

The electrical circuit illustrated in Fig. 2 comprises the electric bell 56 and battery 57 which are so constructed and arranged as to give an aural signal when the switch contacts 49 ad 50 are closed. The circuit also includes a relay switch comprising a solenoid 58 and a knife switch 59 movable by the solenoid core to engage a contact 60 and close a circuit with a generator G or power line and light an electric lamp L or actuate any other suitable apparatus. Similarly, the relay may open the line including the normally closed switch contact 61 in circuit with the resistor R which is supplying the electrical energy for the reaction. Or the relay may operate to close a gas or oil valve which supplies combustible fluid for heating the reagents. Many types of mechanical and electrical apparatus may be controlled by this relay, as will be readily understood by one skilled in the art.

When the device is to be used for timing a chemical reaction, it may be set in a position closely adjacent to the reacting materials, such as in a vulcanizing chamber where rubber goods are to be vulcanized. The tube is first reversed to bring the fluid from the lower reservoir 16 into the upper one, and this is accomplished by springing the arm 36 laterally far enough to clear the clip 40. Then when all of the liquid has flowed through the large tube 18 into the upper reservoir, the parts are returned to their normal operative positions, as shown in Fig. 2, with the clip 40 set in that position on the scale which is required to give the desired angle to the tube 12. The chemical reaction is to be started at the same time that the capillary device is put into its operative position. When the device is not in use it may be held in a reversed position so that all of the liquid will remain normally in the reservoir 14 whereby the device is ready for instant use by snapping the spring arm 36 into place between the arms 41 and 48 of the clip 40.

The rate of flow of the fluid through the capillary tube depends upon the viscosity of that fluid, and the latter will be so selected that the fluid will move at a rate which is proportional to the rate of the chemical reaction when the reagents and the viscous fluid are exposed to the same temperature conditions, or when the temperature conditions are mathematically related. The viscous liquid employed in this apparatus should also show Newtonian flow whereby its viscosity is the same at all rates of shear. This material is preferably non-volatile and stable in air over long periods of time, if it is to be exposed to atmospheric conditions. A fluid which meets all of the above requirements may be made by mixing 17 parts by volume of the viscous oil No. 23497-R, obtained from the Standard Oil Co. of California, with 83 parts of medicinal white oil sold by the United Drug Co. under the trademark "Puretest." This particular oil mixture gives the value of 5500 above mentioned. Other suitable viscous fluids consist of solutions in tricresyl phosphate of different amounts of FFWood Rosin, furnished by the Hercules Powder Co., or of one of the many coumarone resins. Another fluid suitable for a sealed apparatus of the type above described is a mixture of 95.5% of glycerine and 4.5% of water, which shows the above viscosity-temperature coefficient. Various combinations of liquids having solids dissolved therein are readily available and one may employ any suitable viscous medium for a given type of chemical reaction, depending upon the temperature-viscosity relationship desired. For very low temperatures, I may use petroleum hydrocarbons, alcohols, etc. For moderately high temperatures, I may use the fusible synthetic or natural resins.

Figure 3:
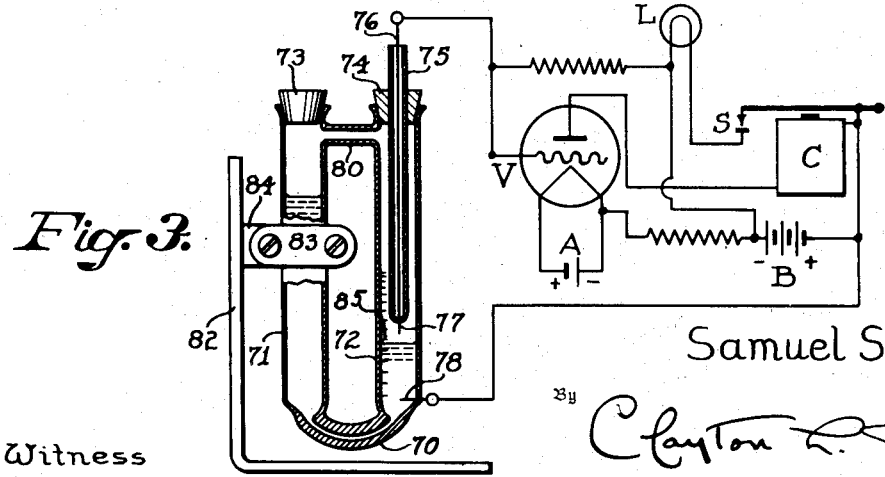
Fig. 3 is a view largely in section of a modification, including a diagrammatic showing of an electrical circuit.

I may also employ a construction in which an electric circuit is made directly by movement of a conductive fluid through the capillary tube to a point where it contacts two electrodes. One suitable construction involving this principle is shown in Fig. 3. This comprises a capillary tube 70 of glass or other suitable material which connects two enlarged tubes 71 and 72 arranged substantially parallel with each other and serving as supply and receiving reservoirs. The open end of the supply tube or reservoir 71 may be closed by a cork or rubber stopper 73. A similar stopper 74 in the other tube 72 is perforated to slidably support a glass or hard rubber tube 75. An electrically conductive wire 76 passes lengthwise through the tube 75 and projects at the lower end to form an electrode or contact point 77 adapted to engage the liquid within the capillary device. The small tube 75 is sealed at its lower end around the wire so as to prevent any access of liquid to the inside of the tube. Another terminal wire 78 projects through the wall of the tube 72 and is sealed in position. Hence, a conductive liquid flowing from the supply reservoir 71 through the capillary tube 70 into the other reservoir 72 makes contact with the wire 78 and ultimately contacts with the wire 77 and thus may complete an electric circuit connected to these two terminals. A large cross tube 80 connects the top ends of the two reservoirs 71 and 72, so that the liquid in the device may be readily transferred from the receiving reservoir 72 to the supply reservoir 71.

The device may be supported on an L-shaped metal standard 82 by means of a clip 83 connected by screws to a back member 84 secured to the standard and thereby forming a clamp for holding the tube in position. The standard is preferably so shaped that it may be tipped over onto the vertical branch so that all of the fluid will flow through the capillary tube 70 and the enlarged tube 80 into the supply reservoir 71 and remain there until the device is required for use. Then when a chemical reaction is to be started, the device is tipped up into the position shown in Fig. 3 and the fluid starts flowing through the capillary tube 70 into the receiving reservoir 72. The tube 75 carrying the upper terminal 77 is vertically slidable through the stopper 74 so that the operator may vary the time at which the electrical contact is to be made. Suitable scale graduations 85 are marked on the reservoir tube 72, and this tube is preferably made transparent for the purpose of readily ascertaining the position of the terminal point. Various modifications of structure may be employed as desired to accomplish these various ends.

Any suitable electrically conductive fluid which satisfies the above described viscosity requirements may be employed. As an example of a fluid which will serve the purposes of developing a photographic image, I may employ 95.5% of glycerine, 3.5% of water and 1.0% of ammonium acetate. Various other fluids having the required viscosity temperature coefficient as above described may be rendered sufficiently conductive for my purposes by the addition of a slight amount of an electrolyte.

The terminals of the two wires 77 and 78 may be suitably connected to any desired electrical apparatus for the purpose of giving a visible or aural signal. If desired, I may employ a vacuum tube amplifier as illustrated in Fig. 3, so that the viscous field need have only a slight degree of conductivity and the electrical flow therethrough may be readily amplified to accomplish desired results. Any suitable electrical apparatus may be employed for the purpose. As illustrated, the device may comprise the vacuum tube V having an A battery and a B battery connected therewith. The B battery and tube are in circuit with the coil of a relay C which serves when the circuit is completed in the capillary device to close the switch S and thereby light a lamp L in an auxiliary circuit. Various arrangements well known to one skilled in the electrical art may be employed for the purpose of providing the desired electrical effects.

It will now be appreciated that I may employ other types of construction having a container and a viscous fluid therein which are relatively movable for the purpose of indicating the completion of a reaction or for operating associated devices. Also, numerous modifications may be made in the apparatus described above and various other types of apparatus may be used in association therewith, so that it will have many uses in the industry. Hence, the above disclosure is to be interpreted as illustrating the general principles of the invention and the preferred construction of apparatus but without imposing limitations on the claims appended hereto.

I claim:

1. A device for timing a temperature dependent chemical reaction comprising walls forming a capillary tube and a reservoir, a viscous fluid in said reservoir having a viscosity-temperature relationship which is substantially the same as the time-temperature relationship of the chemical reaction, means for supporting the tube so that the fluid may be caused to flow therethrough under an impelling force and means for indicating when a predetermined volume of fluid has passed through said tube.

2. A device for timing a temperature dependent chemical reaction comprising walls forming a reservoir and a capillary tube, a viscous fluid in said reservoir having a viscosity-temperature relationship which is substantially the same as the time-temperature relationship of the chemical reaction, adjustable means for supporting the capillary tube at a desired angle and means whereby the flow of a predetermined volume of fluid through the tube indicates the completion of the reaction.

3. A device for timing a temperature dependent chemical reaction comprising walls forming a reservoir and a capillary tube, a viscous fluid in said reservoir having a viscosity-temperature relationship which is substantially the same as the time-temperature relationship of the chemical reaction and an electrical mechanism which is rendered operable by the flow of a predetermined volume of fluid from said reservoir through the tube.

4. A device for timing a temperature dependent chemical reaction comprising walls forming a capillary tube and a reservoir, a viscous fluid within said reservoir having a viscosity-temperature relationship which is substantially the same as the time-temperature relationship of the chemical reaction, electrical apparatus including a circuit and a switch, and means whereby the movement of a predetermined volume of fluid from said reservoir through said capillary tube will operate the switch and thereby affect the electric circuit.

5. An apparatus for timing a temperature dependent chemical reaction comprising walls forming a capillary tube and a reservoir, a viscous fluid within said reservoir having a viscosity-temperature relationship which is substantially the same as the time-temperature relationship of the chemical reaction, means for adjustably supporting the tube at a desired angle, an electrical apparatus comprising a circuit and a switch and means whereby the movement of a predetermined volume of fluid from said reservoir through the capillary tube operates the switch and controls the operation of said apparatus.

6. An apparatus for timing a temperature dependent chemical reaction comprising walls forming a capillary tube and a reservoir, a viscous fluid therein having a viscosity-temperature relationship which is substantially the same as the time-temperature relationship of the chemical reaction, electrical apparatus including a circuit and a switch therein, a support for the tube which holds it in an out of balance condition so that the passage of a predetermined volume of fluid therethrough causes it to move and means whereby such movement operates the switch and affects the electrical apparatus.

7. An apparatus for timing a temperature dependent chemical reaction comprising walls forming a capillary tube and a reservoir, a viscous fluid therein having a viscosity-temperature relationship which is substantially the same as the time-temperature relationship of the chemical reaction, a pivotal support for the tube so arranged that the passage of a predetermined volume of fluid therethrough causes movement of the tube, an electrical apparatus including a circuit and a switch having contacts initially held by the tube in a definite relationship and means whereby movement of the tube shifts the switch contacts and affects the electrical apparatus.

8. An apparatus for timing a temperature dependent chemical reaction comprising a fluid container having a capillary tube communicating with a supply reservoir, a viscous fluid therein having a viscosity-temperature relationship which is substantially the same as the time-temperature relationship of the reaction, a pivotal support holding the container initially in an out of balance condition so that movement of a predetermined volume of fluid through the tube causes the container to move, means for adjustably holding the container initially at a desired angle to regulate the rate of fluid flow through the tube, electrical apparatus including a circuit and a switch having contacts and means whereby the container initially holds said contacts in a definite relationship and relatively shifts the contacts when the tube is moved by the flowing fluid.

9. An apparatus for timing a temperature dependent chemical reaction comprising a container having two reservoirs connected by a capillary tube, a viscous fluid in one of the reservoirs having a viscosity-temperature relationship which is substantially the same as the time-temperature relationship of the chemical reaction, a pivotal support for the container so arranged that the container will move from an initial position after a predetermined volume of fluid has passed through the tube under the influence of gravity and means including a scale arm for adjustably setting the tube at a desired angle to vary the rate of fluid flow.

10. An apparatus for timing a temperature dependent chemical reaction comprising a fluid container having two reservoirs connected by both a capillary tube and a larger tube, a pivotal support for the container so arranged that the container may be moved to cause a rapid flow of fluid through the larger tube to one of the reservoirs, means for holding the container in a position where the fluid may flow only through the capillary tube and means for indicating when a predetermined volume of fluid has flowed through the capillary tube, said fluid having a viscosity-temperature relationship which is substantially the same as the time-temperature relationship of the reaction.

11. An apparatus for timing a temperature dependent chemical reaction comprising walls forming a capillary tube, a supply reservoir and a receiving reservoir, means for supporting the parts so that fluid may flow from the supply reservoir through the tube to the receiving reservoir, a viscous, electrically conductive fluid within the supply reservoir having a viscosity-temperature relationship which is substantially the same as the time-temperature relationship of the reaction, two electric terminals within the receiving reservoir arranged to be connected in an electric circuit by the fluid after a predetermined amount of the fluid has flowed through the tube to the receiving reservoir, and electrical mechanism rendered operable by the completion of said circuit.

12. A device for timing a temperature dependent chemical reaction comprising a capillary tube connecting a supply reservoir and a receiving reservoir, a viscous fluid in the supply reservoir having a viscosity-temperature relationship which is substantially the same as the time-temperature relationship of the chemical reaction, an electric terminal contacting said fluid, a second terminal adjustably mounted in the receiving reservoir and adapted to be contacted by the fluid after a predetermined but variable amount of fluid has flowed through the tube, and electrical mechanism for forming a circuit with said terminals and fluid.

SAMUEL S. KISTLER.